United States Patent
Abramson et al.

(10) Patent No.: US 7,885,399 B2
(45) Date of Patent: Feb. 8, 2011

(54) COST-CONSCIOUS TELECOMMUNICATIONS TERMINAL

(75) Inventors: Sandra R. Abramson, Freehold, NJ (US); Stephen M. Milton, Freehold, NJ (US); William Joseph Toth, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 643 days.

(21) Appl. No.: 11/780,127

(22) Filed: Jul. 19, 2007

(65) Prior Publication Data

US 2009/0022302 A1    Jan. 22, 2009

(51) Int. Cl.
*H04M 7/00* (2006.01)
*H04M 3/42* (2006.01)

(52) U.S. Cl. ................ 379/225; 379/207.02

(58) Field of Classification Search ............ 379/207.02, 379/225
See application file for complete search history.

(56) References Cited

U.S. PATENT DOCUMENTS

| | | | |
|---|---|---|---|
| 5,638,432 A | 6/1997 | Wille et al. | |
| 5,818,921 A | 10/1998 | Vander Meiden et al. | |
| 6,587,555 B1 | 7/2003 | Cripe et al. | |
| 6,608,831 B1 | 8/2003 | Beckstrom et al. | |
| 6,771,636 B1 | 8/2004 | Feyaerts | |
| 6,775,272 B2 | 8/2004 | Galvin et al. | |
| 6,950,507 B1 | 9/2005 | Kaplan | |
| 7,082,119 B1 | 7/2006 | Tamsil | |
| 2006/0159246 A1 | 7/2006 | Abramson et al. | |
| 2006/0239252 A1 | 10/2006 | Kantak et al. | |

FOREIGN PATENT DOCUMENTS

GB   2355624 A   4/2001
GB   2447553 A   9/2008

OTHER PUBLICATIONS

Steckert, "DE Application No. 10 2008 032 865.0-31 Office Action May 26, 2009", , Publisher: DPMA, Published in: DE.
Mr. Jared Stokes, "GB Patent Application No. GB0813044.5 Search Report", Oct. 21, 2008, Publisher: UK Intellectual Property Office, Published in: GB.
Steckert, "DE Application No. 10-2008 032 865.0-31 Office Action Dec. 17, 2009", , Publisher: DPMA, Published in: DE.

*Primary Examiner*—Harry S Hong
(74) *Attorney, Agent, or Firm*—DeMont & Breyer, LLC

(57) ABSTRACT

A method and apparatus are disclosed for routing calls over an organization's private network of private branch exchanges. In particular, when a member of the organization (e.g., an employee, etc.) places a call from his or her affiliated off-premises telecommunications terminal (e.g., cell phone, etc.), the call is automatically routed to its destination through at least a portion of the private network of private branch exchanges when doing so reduces the cost of the call. In the illustrative embodiment, the call routing is performed automatically and transparently via software on the affiliated terminals (i.e., employees' cell phones) and on the organization's private branch exchanges.

10 Claims, 5 Drawing Sheets

Figure 2 (PRIOR ART)

| PBX On-Premises Telephone Number | Off-Premises Telephone Number |
|---|---|
| 732-555-0102 x11 | 201-555-1236 |
| 732-555-0102 x12 | 908-555-3381 |
| ⋮ | ⋮ |
| 732-555-0102 x99 | 212-555-6784 |

COST-CONSCIOUS TELECOMMUNICATIONS TERMINAL

FIELD OF THE INVENTION

The present invention relates to telecommunications in general, and, more particularly, to emulating the behavior of a private branch exchange at a second private branch exchange.

BACKGROUND OF THE INVENTION

An organization that desires to provide employees at one location with telephones has, in general, two options. First, the organization can acquire one telephone and one telephone line per employee from the telephone company. Second, the organization can acquire one telephone per employee, a small number of telephone lines from the telephone company, and a piece of equipment that enables the employee's telephones to share the small number of telephone lines. In general, the second option is substantially less expensive than the first option, and the piece of equipment that enables the employees' telephones to share the small number of telephone lines is called a "private-branch exchange" or "PBX." In addition, private-branch exchanges typically provide a variety of useful telecommunications features to their users, such as call forwarding, three-way conferencing, and so forth.

FIG. 1 depicts a schematic diagram of telecommunications system 100 in the prior art. Telecommunications system 100 comprises affiliated off-premises telecommunications terminals 101-1 through 101-X, wherein X is a positive integer; unaffiliated off-premises telecommunications terminal 102; affiliated on-premises telecommunications terminals 103-1 through 103-X; private branch exchange telephone system 104; and telecommunications network 105, interconnected as shown.

The terms "affiliated" and "unaffiliated," as they apply to the off-premises terminals, refer to whether an off-premises terminal is affiliated with an on-premises terminal (i.e., a terminal served by private branch exchange 104). The relationship of an on-premises terminal (e.g., terminal 103-1, etc.) with an affiliated off-premises terminal (e.g., terminal 101-1, etc.) is described below and with respect to FIG. 2, with regards to extending a received call to one or both terminals.

Private branch exchange 104 is capable of switching incoming calls from telecommunications network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to telecommunications network 105 via one or more transmission lines that connect private branch exchange 104 to telecommunications network 105.

Private branch exchange 104 is capable of also extending an incoming call to a telephone number in telecommunications network 105, in addition to switching the incoming call to on-premises terminal 103-$n$, wherein n is an integer between 1 and N, inclusive. The telephone number that is extended-to in telecommunications network 105 corresponds to an affiliated terminal 101-$n$.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private branch exchange 104.

Private branch exchange 104 acts as a "bridge" between address space 111 and address space 112. When a calling party places a call to someone served by private branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on-premises telephone number is one that exists within the address space of the private branch exchange, and an off-premises telephone number is one that exists within the address space of the Public Switched Telephone Network.

Some private branch exchanges enable the user of an on-premises terminal to associate an off-premises terminal's telephone number (e.g., the user's cell phone number, etc.) with the on-premises terminal's telephone number for features such as automatic call forwarding. In such instances the off-premises terminal's telephone number is said to be mapped to the on-premises terminal's telephone number. Typically a private branch exchange that provides such a mapping feature stores the mappings in a table, such as the one shown in FIG. 2.

SUMMARY OF THE INVENTION

The present invention is applicable to organizations that have private branch exchanges (PBXs) at two or more different sites, and a private network (e.g., leased lines, a virtual private network [VPN] over the Internet, etc.) that connects some or all of the private branch exchanges. In particular, the present invention pertains to any call from an affiliated off-premises terminal (typically, an employee's cell phone) to any destination (e.g., another cell phone, a wireline terminal, a private branch exchange, etc.). For example:

- an employee who is on business travel in the UK might call a supplier in Taiwan;
- an employee who is on business travel in St. Louis might call a customer in New Jersey; or
- an employee who is at a restaurant near his or her office in New York might call a fellow employee in San Francisco.

In accordance with the illustrative embodiment, when an employee places a call from his or her affiliated off-premises terminal (e.g., cell phone, etc.), the call is automatically routed to its destination through the organization's private network of private branch exchanges when doing so reduces the cost of the call. For example, suppose an employee in Finland and places a call from his cell phone to a customer in Spain. The call might be routed from his cell phone to the customer's terminal through the organization's private branch exchanges in Helsinki, Munich, Paris, and Madrid, thereby minimizing the toll charges for the call by maximizing the portion of the route over the organization's private network. (Note that in accordance with the illustrative embodiment, it is immaterial whether the employee works at the organization's Helsinki branch, or is an employee of the organization's New York branch and is on travel in Finland.) In the illustrative embodiment, the call routing is performed automatically and transparently via software on the affiliated terminals (i.e., employees' cell phones) and on the organization's private branch exchanges.

The illustrative embodiment comprises: receiving at a telecommunications terminal an input for placing a first call to a destination D; and placing a second call, in response to the input, from the telecommunications terminal to a first of a plurality of associated private branch exchanges; wherein a call from the telecommunications terminal to the first private branch exchange incurs no more cost than a call from the telecommunications terminal to any other of the plurality of associated private branch exchanges.

BRIEF DESCRIPTION OF THE DRAWINGS

FIG. 2 depicts an illustrative table that maps off-premises telephone numbers to on-premises telephone numbers, in accordance with the prior art.

DETAILED DESCRIPTION

Figure 1:
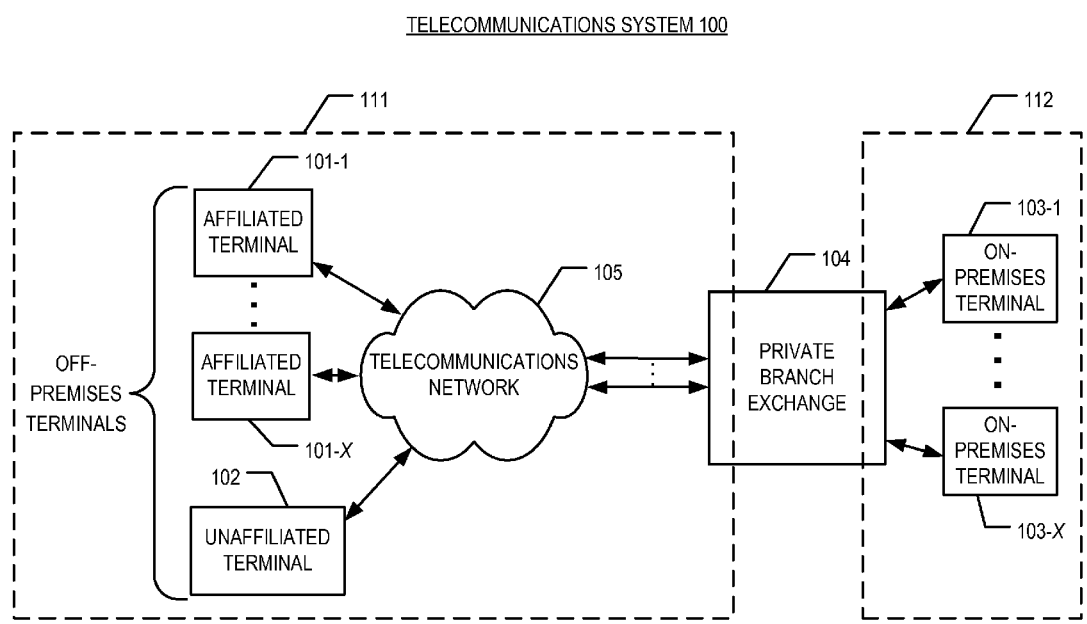
FIG. 1 depicts a schematic diagram of telecommunications system 100, in accordance with the prior art.
Figure 3:
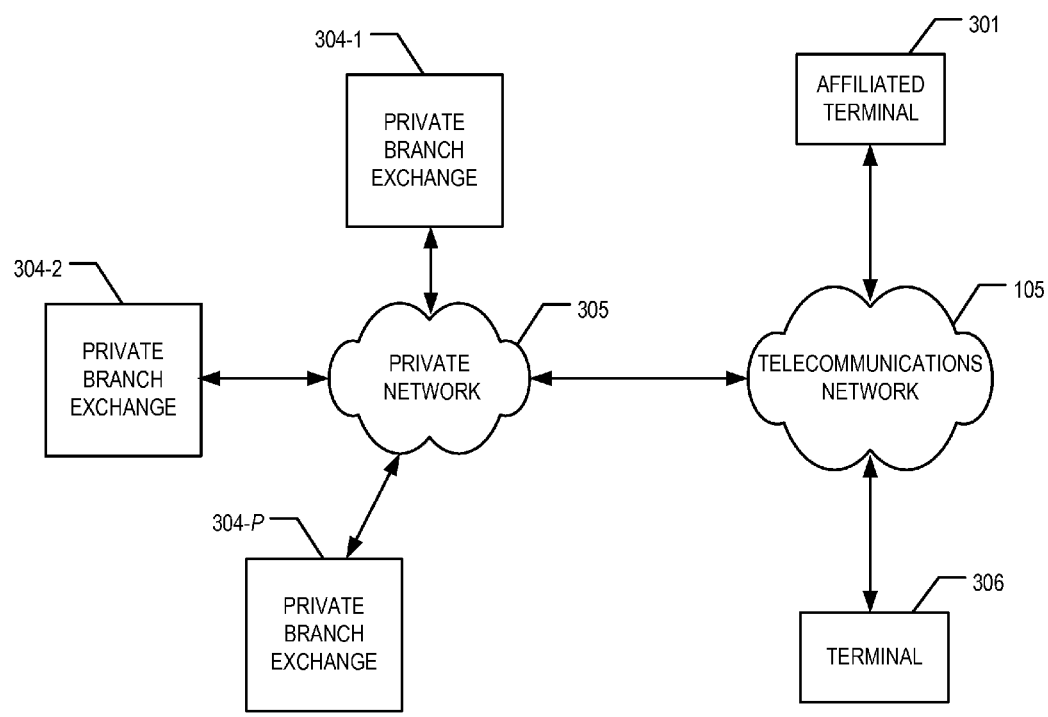
FIG. 3 depicts a schematic diagram of telecommunications system 300, in accordance with the illustrative embodiment of the present invention.

FIG. 3 depicts a schematic diagram of telecommunications system 300, in accordance with an illustrative embodiment of the present invention. Telecommunications system 300 comprises telecommunications network 105, private branch exchanges 304-1 through 304-P, where P is an integer greater than one, private network 305, off-premises affiliated telecommunications terminal 301, and telecommunications terminal 306, interconnected as shown.

Private branch exchanges 304-1 through 304-P provide all the functionality of private branch exchange 104 of the prior art, and are also capable of performing the tasks described below and with respect to FIG. 5.

Figure 4:
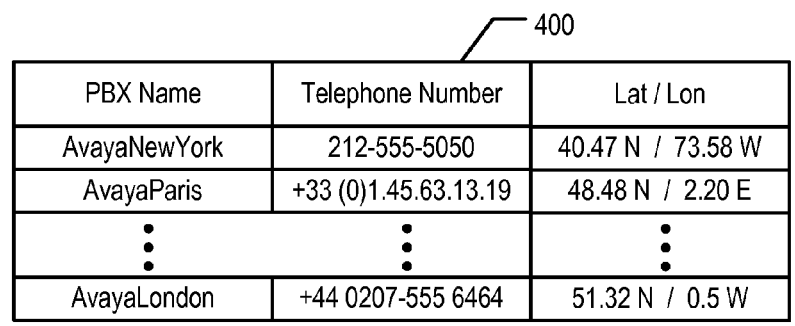
FIG. 4 depicts illustrative table 400 that is stored at affiliated telecommunications terminal 301, in accordance with the illustrative embodiment of the present invention.

Off-premises affiliated telecommunications terminal 301 is affiliated with some on-premises terminal of one of private branch exchanges 304-1 through 304-P. The particular private branch exchange and on-premises terminal with which terminal 301 is affiliated is immaterial—it matters only that terminal 301 is affiliated with some on-premises terminal of the organization. In accordance with the illustrative embodiment, wireless telecommunications terminal 301 is capable of storing a table of information about the organization's private branch exchanges (e.g., their phone numbers, their geo-locations, etc.)—such as illustrative table 400 shown in FIG. 4—and of performing the tasks described below and with respect to FIG. 5.

Figure 5:
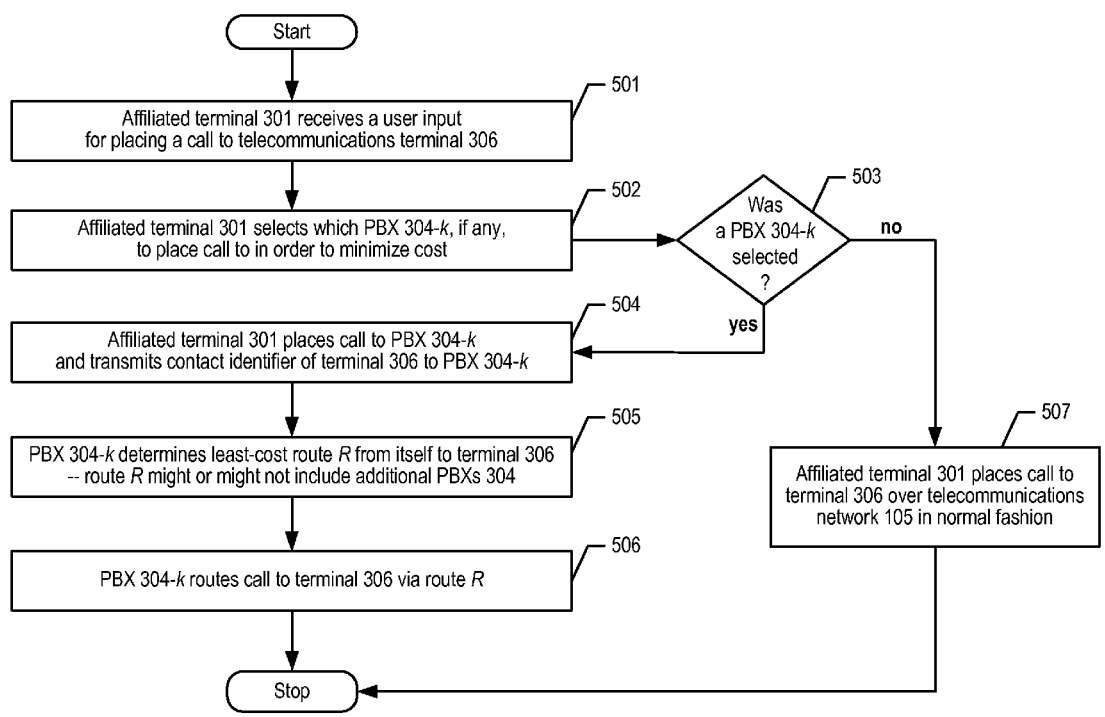
FIG. 5 depicts a flowchart of the salient tasks of affiliated telecommunications terminal 301 and private branch exchanges 304, as shown in FIG. 3, in accordance with the illustrative embodiment of the present invention.

FIG. 5 depicts a flowchart of the salient tasks of affiliated telecommunications terminal 301 and of private branch exchanges 304-1 through 304-P, in accordance with the illustrative embodiment of the present invention. It will be clear to those skilled in the art which tasks depicted in FIG. 5 can be performed simultaneously or in a different order than that depicted.

At task 501, affiliated terminal 301 receives an input from its user for placing a call to telecommunications terminal 306, in well-known fashion.

At task 502, affiliated terminal 301 first determines whether a call from affiliated terminal 301 to terminal 306 would incur less cost if a portion of the route travels over private network 305. As will be appreciated by those skilled in the art, this determination might be based on a variety of factors such as the particular billing plan for affiliated terminal 301, the current time and date, the network that affiliated terminal is currently connected to (e.g., Verizon Wireless USA, etc.), the entry point at which affiliated terminal 301 connects to this network (e.g., the base station currently serving affiliated terminal 301, etc.), the current geo-location of affiliated terminal 301 (if known), and so forth. As will further be appreciated by those skilled in the art, in some embodiments affiliated terminal 301 might make this determination itself (e.g., based on information stored locally in table 400, etc.), while in some other embodiments affiliated terminal 301 might send a query to another entity (e.g., a base station, a server, a geo-location system, etc.) to make this determination and return the result to affiliated terminal 301. As will further be appreciated by those skilled in the art, in some other embodiments of the present invention the cost of a call might be quantified by some non-monetary metric rather than toll charges, and it will be clear to those skilled in the art, after reading this disclosure, how to make and use such embodiments.

If it is determined that a call through private network 305 would incur less cost, then affiliated terminal 301 selects which private branch exchange 304-k, where k is a positive integer less than or equal to P, to call in order to minimize cost. For example, suppose the user of affiliated terminal 301 is in New York's Grand Central Station and inputs a command to the terminal to call a customer. Then affiliated terminal 301 might select the private branch exchange of the organization's Manhattan office as the "best" PBX to call, because it minimizes the portion of the route that is not over private network 305, and therefore (presumably) minimizes the cost of the call. As in the determination above, the cost of a particular route might be based on a variety of factors such as the billing plan, the current time and date, etc., and thus the selection of the best private branch exchange to call will depend on these factors. Furthermore, as in the determination above, in some embodiments affiliated terminal 301 might select the best private branch exchange itself (e.g., based on information stored locally in table 400, etc.), while in some other embodiments affiliated terminal 301 might send a query to another entity to select the private branch exchange and return the result to affiliated terminal 301.

At task 503, a branch is executed based on the first determination of task 502—i.e., whether a call from affiliated terminal 301 to terminal 306 would incur less cost if a portion of the route travels over private network 305. If this determination is affirmative, the method of FIG. 5 proceeds to task 504, otherwise execution continues at task 507.

At task 504, affiliated terminal 301 places a call to selected private branch exchange 304-k, and transmits telecommunications terminal 306's phone number to PBX 304-k as the ultimate destination of the call. In accordance with the illustrative embodiment, affiliated terminal 301 calls a special extension of private branch exchange 304-k that is not associated with any telecommunications terminal, but rather is reserved for the routing of incoming calls to an arbitrary destination (e.g., an unaffiliated off-premises terminal, an affiliated off-premises terminal, an on-premises terminal, another private branch exchange, etc.). As will be appreciated by those skilled in the art, some other embodiments of the present invention might utilize an alternative mechanism for instructing PBX 304-k to route the call to telecommunications terminal 306.

At task 505, private branch exchange 304-*k* determines the least-cost route R from itself to terminal 306, in well-known fashion (route R might or might not include additional private branch exchanges 304).

At task 506, private branch exchange 304-*k* routes the call to terminal 306 via the least-cost route R determined at task 505, in well-known fashion. After task 506 is completed, the method of FIG. 5 terminates.

At task 507, affiliated terminal 301 places a call to terminal 306 over telecommunications network 105 in normal fashion. After task 507 is completed, the method of FIG. 5 terminates.

As will be appreciated by those skilled in the art, although the illustrative embodiment is disclosed in the context of reducing toll charges, it will be clear to those skilled in the art, after reading this disclosure, how to make and use other embodiments of the present invention that reduce other kinds of costs (e.g., transmission delay, distance traveled, number of network segments traversed, etc.).

As will be further appreciated by those skilled in the art, although the illustrative embodiment does not explicitly include any mechanism by which private branch exchanges 304 authenticate affiliated terminal 301, such authentication methods are well-known in the art, and it will be clear to those skilled in the art, after reading this disclosure, how to make and use embodiments of the present invention that incorporate such methods.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving by a telecommunications terminal an input for placing a first call to a destination D;
   selecting by said telecommunications terminal, based at least partially on an entry point through which said telecommunications terminal connects to a network, one of a plurality of associated private branch exchanges; and
   placing by said telecommunications terminal, in response to said input, a second call to the selected private branch exchange;
   wherein a call from said telecommunications terminal to the selected private branch exchange incurs no more cost than a call from said telecommunications terminal to any other of said plurality of associated private branch exchanges.

2. The method of claim 1 wherein said second call is directed to a telephone number that is in the address space of the selected private branch exchange and that is not associated with any telecommunications terminal.

3. The method of claim 2 wherein said telephone number is for establishing a connection to a destination that is specified during a call to said telephone number.

4. The method of claim 3 further comprising transmitting by said telecommunications terminal to the selected private branch exchange an identifier that identifies said destination D.

5. The method of claim 4 wherein said identifier is a telephone number that is not in the address space of any of said plurality of associated private branch exchanges.

6. The method of claim 3 wherein said connection traverses a path that comprises one or more of said plurality of associated private branch exchanges.

7. A method comprising:
   receiving by a telecommunications terminal an input for placing a first call to a destination D;
   selecting by said telecommunications terminal, based at least partially on what network said telecommunications terminal is connected to, one of a plurality of associated private branch exchanges; and
   placing by said telecommunications terminal, in response to said input, a second call to the selected private branch exchange;
   wherein a call from said telecommunications terminal to the selected private branch exchange incurs no more cost than a call from said telecommunications terminal to any other of said plurality of associated private branch exchanges.

8. A method comprising:
   receiving by a telecommunications terminal an input for placing a first call to a destination D;
   receiving by said telecommunications terminal an identifier from a wireless base station;
   selecting by said telecommunications terminal, based at least partially on said identifier, one of a plurality of associated private branch exchanges; and
   placing by said telecommunications terminal, in response to said input, a second call to the selected private branch exchange;
   wherein a call from said telecommunications terminal to the selected private branch exchange incurs no more cost than a call from said telecommunications terminal to any other of said plurality of associated private branch exchanges.

9. A method comprising:
   receiving by a telecommunications terminal an input for placing a first call to a destination D;
   selecting by said telecommunications terminal, based at least partially on the geo-location of said telecommunications terminal, one of a plurality of associated private branch exchanges; and
   placing by said telecommunications terminal, in response to said input, a second call to the selected private branch exchange;
   wherein a call from said telecommunications terminal to the selected private branch exchange incurs no more cost than a call from said telecommunications terminal to any other of said plurality of associated private branch exchanges.

10. A method comprising:

receiving by a telecommunications terminal an input for placing a first call to a destination D;

selecting by said telecommunications terminal, based at least partially on the calendrical time at said telecommunications terminal, one of a plurality of associated private branch exchanges; and placing by said telecommunications terminal, in response to said input, a second call to the selected private branch exchange;

wherein a call from said telecommunications terminal to the selected private branch exchange incurs no more cost than a call from said telecommunications terminal to any other of said plurality of associated private branch exchanges.

* * * * *